(12) United States Patent
Thomas

(10) Patent No.: US 9,301,449 B1
(45) Date of Patent: Apr. 5, 2016

(54) FRUIT HARVESTER AND METHODS OF MAKING AND USING THE SAME

(71) Applicant: Patrick Stewart Thomas, Fresno, CA (US)

(72) Inventor: Patrick Stewart Thomas, Fresno, CA (US)

( * ) Notice: Subject to any disclaimer, the term of this patent is extended or adjusted under 35 U.S.C. 154(b) by 0 days.

(21) Appl. No.: 14/042,240

(22) Filed: Sep. 30, 2013

Related U.S. Application Data

(60) Provisional application No. 61/707,763, filed on Sep. 28, 2012.

(51) Int. Cl.
 *A01D 46/00* (2006.01)
 *A01D 46/28* (2006.01)

(52) U.S. Cl.
 CPC .............. *A01D 46/28* (2013.01); *A01D 46/285* (2013.01)

(58) Field of Classification Search
 CPC ....... A01D 46/24; A01D 46/26; A01D 46/28; A01D 46/005
 USPC ............... 56/328.1, 340.1, 330, 128, DIG. 19
 See application file for complete search history.

(56) References Cited

U.S. PATENT DOCUMENTS

| | | | | | |
|---|---|---|---|---|---|
| 1,935,803 | A | * | 11/1933 | Lilliston | 460/128 |
| 2,616,768 | A | * | 11/1952 | Stemm | 182/2.8 |
| 2,639,573 | A | * | 5/1953 | McLaughlin | 56/328.1 |
| 2,679,133 | A | * | 5/1954 | Soderholm | 56/328.1 |
| 3,325,984 | A | * | 6/1967 | Christie et al. | 56/330 |
| 3,385,042 | A | * | 5/1968 | Christie et al. | 56/330 |
| 3,452,526 | A | * | 7/1969 | Meitl et al. | 56/328.1 |
| 3,452,527 | A | * | 7/1969 | Reynolds et al. | 56/328.1 |
| 3,492,801 | A | * | 2/1970 | Olmo et al. | 56/330 |
| 3,590,566 | A | * | 7/1971 | Cutts et al. | 56/330 |
| 3,606,741 | A | * | 9/1971 | Olmo et al. | 56/1 |
| 3,623,309 | A | * | 11/1971 | Stang et al. | 56/330 |
| 3,651,624 | A | * | 3/1972 | Bandemer | 56/28 |
| 3,703,802 | A | * | 11/1972 | Wrestler et al. | 56/13.3 |
| 3,768,240 | A | * | 10/1973 | Lyon | 56/330 |
| 3,855,760 | A | * | 12/1974 | Smith et al. | 56/13.2 |
| 3,964,244 | A | * | 6/1976 | Vallicella | 56/329 |
| 4,172,352 | A | * | 10/1979 | McCarthy et al. | 56/340.1 |
| 5,074,107 | A | * | 12/1991 | Windemuller | 56/330 |
| 5,113,644 | A | * | 5/1992 | Windemuller et al. | 56/330 |
| 5,170,614 | A | * | 12/1992 | Williamson et al. | 56/330 |
| 5,174,093 | A | * | 12/1992 | Rodriguez | 56/327.1 |
| 5,423,166 | A | * | 6/1995 | Scott | 56/330 |
| 5,592,805 | A | * | 1/1997 | Croft | 56/16.4 R |

(Continued)

FOREIGN PATENT DOCUMENTS

| | | | | | |
|---|---|---|---|---|---|
| EP | 275602 A1 | * | 7/1988 | | A01D 46/00 |
| EP | 639324 A1 | * | 2/1995 | | A01D 46/28 |
| GB | 2088686 A | * | 6/1982 | | A01D 45/04 |

*Primary Examiner* — Thomas B Will
*Assistant Examiner* — Joan D Misa
(74) *Attorney, Agent, or Firm* — Andrew D. Fortney; Central California IP Group, P.C.

(57) ABSTRACT

A fruit harvester and methods of making and using the same are disclosed. The fruit harvester includes a frame and a collector connected to the frame. The collector includes a beater, one or more arms supporting the beater, one or more conveyor belts or moving beds configured to collect fruit dislodged from the plant(s) by the beater; and one or more augers configured to deposit the fruit into one or more bins held by the frame. The beater is configured to dislodge fruit and plant matter from one or more plants to which the fruit and plant matter are attached. The arm(s) are attached directly or indirectly to the frame. The conveyor belt(s) or moving bed(s) are configured to carry the fruit to the auger(s).

16 Claims, 4 Drawing Sheets

(56) References Cited

U.S. PATENT DOCUMENTS

| | | | | |
|---|---|---|---|---|
| 5,660,033 A | * | 8/1997 | Korthuis et al. | 56/330 |
| 5,908,352 A | * | 6/1999 | Meester et al. | 460/113 |
| 5,946,896 A | * | 9/1999 | Daniels | 56/328.1 |
| 6,009,696 A | * | 1/2000 | Walker et al. | 56/328.1 |
| 6,012,276 A | * | 1/2000 | Walker et al. | 56/330 |
| 6,070,402 A | * | 6/2000 | Korthuis et al. | 56/330 |
| 6,105,352 A | * | 8/2000 | Tremblay et al. | 56/330 |
| 6,138,447 A | * | 10/2000 | Stivers et al. | 56/221 |
| 6,378,282 B1 | * | 4/2002 | Carlton | 56/330 |
| 6,557,335 B2 | * | 5/2003 | Amaro et al. | 56/328.1 |
| 6,854,255 B1 | * | 2/2005 | Emerson | 56/330 |
| 7,069,713 B2 | * | 7/2006 | Marakis | 56/330 |
| 7,131,254 B2 | * | 11/2006 | Flora et al. | 56/328.1 |
| 7,536,847 B2 | * | 5/2009 | Lynes | 56/327.1 |
| 7,748,205 B2 | * | 7/2010 | Amaro | 56/328.1 |
| 7,882,686 B2 | * | 2/2011 | Bryan et al. | 56/328.1 |

\* cited by examiner

FRUIT HARVESTER AND METHODS OF MAKING AND USING THE SAME

CROSS REFERENCE TO RELATED APPLICATION

This application claims the benefit of U.S. Provisional Patent Application Nos. 61/707,763, filed on Sep. 28, 2012, which is incorporated herein by reference as if fully set forth herein.

FIELD OF THE INVENTION

The present invention generally relates to the field of mechanical harvesting. More specifically, embodiments of the present invention pertain to mechanical harvesters for fruit and methods of making and using the same.

DISCUSSION OF THE BACKGROUND

Traditionally, when grapes intended for raisins were ready to be harvested, they were picked by hand and placed on trays or paper placed adjacent to the rows of grapevines. The grapes were then dried by the sun for 17-21 days to produce raisins.

Raisin grapes can also be harvested mechanically. In one approach, the grape-laden canes of the grapevine are cut by hand, and later, a machine moves down the grapevine rows collecting the plant matter (e.g., canes, leaves, etc.) and grapes. The harvester transfers the grapes, via a conveyor belt, to another machine towed by a tractor in the adjacent row. The harvester may remove some of the plant matter. The second machine lays down a continuous layer of paper along the row and spreads the grapes thereon. After the grapes have suitably dried to become raisins, a third machine collects the raisins from the paper and transfers the raisins to a fourth machine in an adjacent row that deposits the raisins into bins for transportation and/or further processing. While mechanical harvesting offers many advantages over manual harvesting such as lower labor costs, it still involves the use of multiple machines and multiple passes through the vineyard which increases the chance of damage to the vines and also increases operating costs.

Grapevines are commonly grown along a trellis system. Typical trellis options for grapevines include conventional trellises, open gable trellises and overhead trellises. In an overhead trellis system, the grapevines are planted in a row, and their canes are trained to grow across a grid of intersecting wires running across the gaps between the rows of grapevines.

The type of trellis system influences the harvesting method of the grapes. For instance, the mechanical harvesting system described above is typically used to harvest grapes grown on a conventional or open gable trellis. Such harvesting methods, however, are not suitable for grapes grown on overhead trellis because the machinery cannot drive down the rows.

An overhead trellis system is advantageous for dried-on-the-vine harvesting. When the grapes are ready to be harvested, the canes are cut and the grapes are left to dry on the vine, about 6-8 weeks. After the grapes are suitably dried, a mechanized harvester travels down the rows, underneath the overhanging trellis wires, and collects the hanging raisins. Mechanical harvesters for dried-on-the-vine harvesting are typically low-profile, self-propelled vehicles and use a series of tubes or teeth, usually made of plastic, to vibrate the plant matter and grapes for collection into bins.

While self-propelled mechanical harvesters are commonly used for dried-on-the-vine harvesting, they can be expensive. The weight and height (e.g., clearance from the ground) of self-propelled mechanical harvesters may cause them to become stuck in mud or uneven ground. Therefore, it is desirable to provide a mechanical harvester that is more cost-effective, versatile (e.g., capable of adjustment in the field), forgiving, and that will not cause undue damage to the harvester, the trellis and/or grapevines.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to a fruit harvester and methods of making and using the same. The present harvester is particularly advantageous for harvesting and/or removing fruit from overhead or overhanging plants, such as vines on an overhead trellis.

In one aspect, the present invention relates to a fruit harvester, comprising a frame and a collector connected to the frame. The collector comprises a beater configured to dislodge fruit and plant matter from one or more plants to which the fruit and plant matter are attached; one or more arms attached directly or indirectly to the frame, supporting the beater; one or more conveyors (e.g., conveyor belts or moving beds) configured to collect fruit dislodged from the plant(s) by the beater; and one or more augers configured to deposit the fruit into one or more bins held by the frame. The conveyor(s) may carry the fruit to the auger(s). The collector may comprise two arms, a hydraulic or mechanical lifter connected to at least one of the arms (e.g., a hydraulic or mechanical lifter connected to each of the arms), and a central axis or rod between the two arms that provides for rotational movement of the beater. The beater may have a cross-sectional shape selected from square, rectangular, circular, hexagonal, oval, and square or rectangular with one or more rounded edges.

Various embodiments of the present fruit harvester further include one or more blowers secured to the frame and/or collector, configured to blow, move or force air over the fruit and plant matter and separate some or all of the plant matter from the fruit. In such embodiments, the conveyor(s) may be configured to move the fruit and plant matter into the air blown, moved or forced by the one or more blowers. Alternatively or additionally, the harvester may further comprise one or more motors to operate the conveyor(s), the auger(s), and/or the blower(s).

In some embodiments, the frame has an upper surface and a lower surface parallel or substantially parallel thereto, coupled together by multiple upright beams. Each of the upper surface and the lower surface may be substantially rectangular, and comprise first and second beams coupled to each other by a third beam at or near one end of the first and second beams and a fourth beam at an opposite end of the first and second beams. In one implementation, the lower surface of the frame further comprises at least one fifth beam fixed perpendicularly to the first and second beams of the lower surface of the frame, and the lower surface of the frame is configured to hold a plurality of bins. In such an implementation, the collector is generally movably connected to the upper surface of the frame, to enable collecting the fruit in each of the plurality of bins. The harvester also further comprises a mechanism for moving the collector along the upper surface of the frame is such implementation(s).

In other and/or additional embodiments, the present fruit harvester is used to harvest and/or collect fruit from substantially evenly-spaced rows of plants. In such a case, the harvester may further include a front axle and a rear axle, each with at least two wheels thereon, wherein a width between the wheels on each of the front axle and the rear axle is about equal to a distance between adjacent rows of the plants.

A further aspect of the present invention relates to a harvesting tractor, comprising the present fruit harvester, and a tractor, comprising an engine, a plurality of wheels, and a steering mechanism. The frame in the harvesting tractor may further comprise one or more shafts at a central location along a lower surface of the frame, in which case the harvester further comprises a front axle and/or a rear axle, each with at least two wheels fixed thereto. When the front and/or rear axle is coupled to such a shaft, it is rotatable around the shaft, allowing the axle to pivot.

A further aspect of the present invention relates to a method of harvesting fruit, comprising attaching the present harvester to a tractor or other vehicle, Alternatively, the method of harvesting fruit may comprise dislodging said fruit from one or more plants to which the fruit is attached with a beater, collecting said dislodged fruit on a collector, removing plant matter from the fruit, and collecting said fruit in one or more bins. In the method of harvesting fruit, dislodging said fruit also often dislodges plant matter from the plants. Thus, removing the plant matter from the fruit may comprise blowing, moving or forcing air over the fruit and plant matter to separate some or all of the plant matter from the fruit. The collector may therefore comprise a conveyor that moves the fruit and plant matter into the blown, moved or forced air in some embodiments.

In a further aspect, the present invention also relates to a method of making a fruit harvester, comprising forming a frame, forming a collector, configured to be supported by the frame, and movably attaching the collector to the frame. Forming the frame may comprise welding or coupling multiple beam members in a rectangular arrangement and/or pattern, and the frame may be configured to securely hold a plurality of fruit collection bins. Forming the collector may comprise attaching one or more arms to directly or indirectly to the frame, attaching a beater to the arm(s), attaching a hydraulic or mechanical lifter to the arm(s) and/or the beater, attaching one or more conveyors to the frame, and/or attaching one or more augers to the rear of the collector. Optionally, forming the collector may comprise attaching one or more blowers at or near the rear of the frame and/or attaching one or more series of fins to the side(s) of the collector. The present method of making a fruit harvester may further comprise mechanically coupling one or more belts, hydraulics and/or motors to the conveyor(s), blower(s) and/or auger(s) to facilitate operation of the conveyor(s), blower(s), and/or auger(s).

The present invention improves a farmer's ability to collect fruit from overhead or overhanging plants such as vines on an overhead trellis using relatively simple machinery. The present harvester is less likely to suffer mechanical damage or become stuck in wet or saturated soil, thereby enabling increased operational efficiency (e.g., in the present method of harvesting fruit). Furthermore, the present invention enables overhead fruit harvesting equipment to become widely available to a typical farmer on a small or medium-sized farm, thereby enabling the farmer to harvest the fruit at times that are convenient or optimal to the farmer. These and other advantages of the present invention will become readily apparent from the detailed description of various embodiments below.

DETAILED DESCRIPTION

Figure 1:
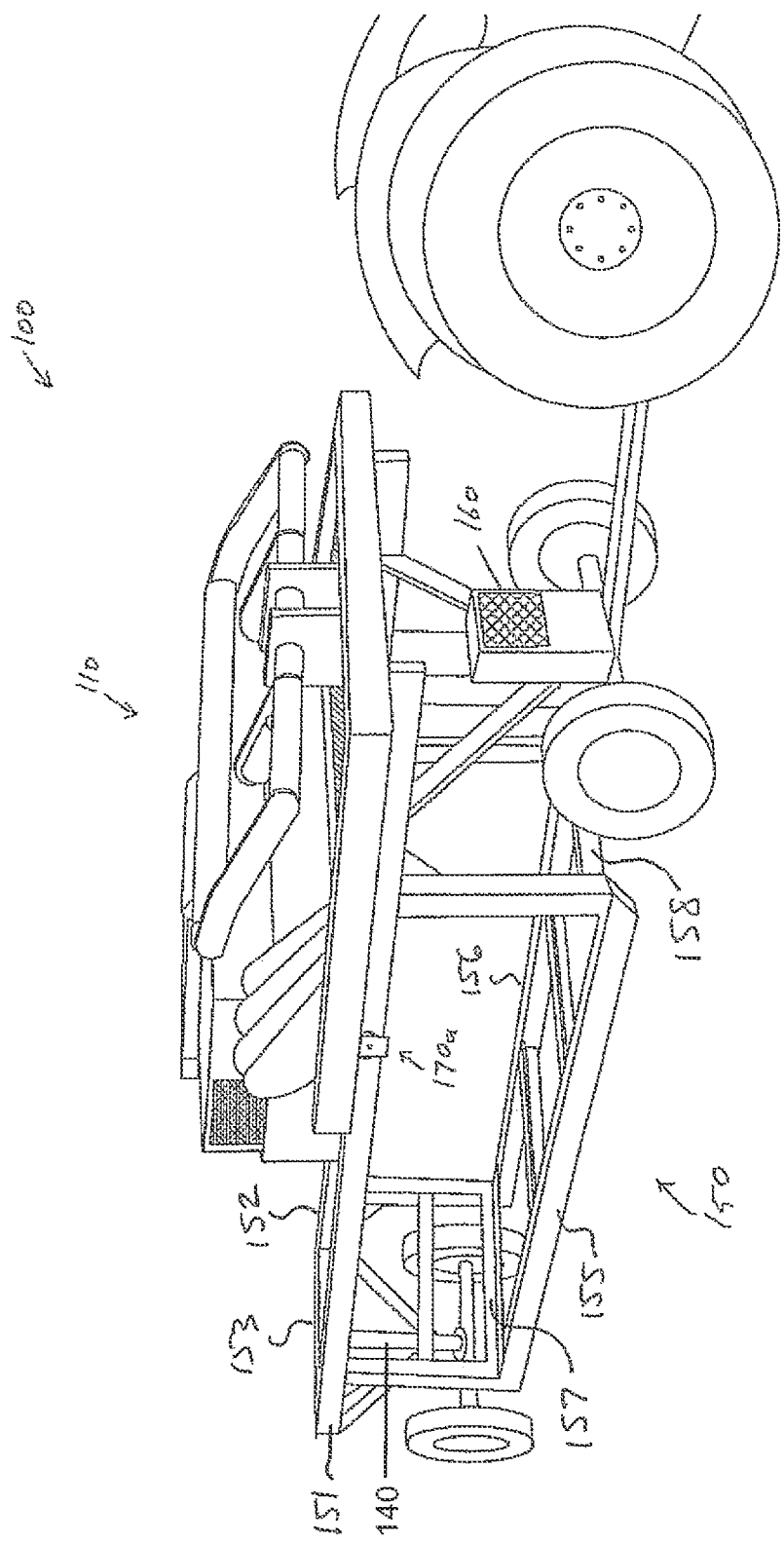
FIG. 1 is a perspective view of a mechanical harvester according to one embodiment.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the disclosure. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention.

Thus, the technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise. Each characteristic is generally only an embodiment of the invention disclosed herein, rather than indicative of the entire invention.

For the sake of convenience, the terms "vines," "canes" and "plant matter," and the terms "fruit," "crop," "grapes," and "raisins" are generally used interchangeably herein, but these terms are generally given their art-recognized meanings.

The present invention relates to a mechanical harvester and methods of manufacturing and using the same. Embodiments of the present invention can advantageously provide for a mechanical harvester that harvests fruit grown in uneven or muddy fields so as to minimize damage to the vines, trellis, and/or mechanical harvester, as well as more efficiently harvesting the grapes/raisins. Further, embodiments of the present invention can advantageously provide for the farmer to harvest according to his schedule as it requires fewer people than manual harvesting and/or the need for multiple machines and the people to operate them. In addition, embodiments of the present invention enable the farmer to unload full bins of fruit anywhere (e.g., in the field, at ends of plant rows, at a central collection such as a barn, shed or similar outbuilding) and load empty bins onto the frame of the harvester anywhere. Embodiments of the present invention also relate to methods of making and using such mechanical harvester.

Embodiments of the present invention relate to a mechanical harvester configured to be towed behind a vehicle, such as a tractor, and configured to harvest fruit (e.g., raisins) by using a beater to dislodge raisins and plant matter from the grapevines on a trellis onto one or more conveyor belts that move the raisins and plant matter to one or more blowers that separate the raisins from some or all of the plant matter and then uses one or more augers to deposit the raisins into bins.

These and other advantages of the present invention will become readily apparent from the detailed description of various embodiments below.

An Exemplary Mechanical Harvester

In a first aspect of the present invention, the mechanical harvester may comprise a support frame and a collector movably connected to the support frame. FIG. 1 illustrates an exemplary mechanical harvester 100 comprising collector 110 and support frame 150. While FIG. 1 describes a general mechanical harvester, embodiments of the present invention should not be limited to just the configuration of FIG. 1. The support frame 150 of FIG. 1 may be formed from any suitable material such as metal, wood, plastic or other combination thereof. However, a metal, such as steel, is generally preferred.

The support frame 150 is generally rectangular in shape, having an upper surface generally parallel to a lower surface and where the upper and lower surfaces are coupled together by multiple upright beams. The upper surface comprises a frame generally rectangular in shape, comprising first and second beams 151-152 that are coupled to each other at or near their ends by a third beam 153 at one end and a fourth beam at the opposite end. In one embodiment, the first and second beams are generally parallel to each other. In another embodiment, the first and second beams are longer than the third and fourth beams. In a further embodiment, one or more beams may be coupled between the first and second beams of the upper surface at any suitable interval along the first and second beams.

The lower surface comprises a frame generally rectangular in shape, comprising first and second beams 155-156 that are coupled to each other at or near their ends by a third beam 157 at one end and a fourth beam 158 at the opposite end. In one embodiment, the first and second beams are generally parallel to each other. In another embodiment, the first and second beams are longer than the third and fourth beams. In a further embodiment, one or more beams may be coupled between the first and second beams of the lower surface at any suitable interval along the first and second beams. In one example, the beam(s) may be suitably spaced for supporting one or more bins. Thus, the spacing interval between perpendicular beams along the first and second beams of the lower surface may be regular, to accommodate multiple bins having the same size.

The upper and lower surfaces are coupled together (e.g., by welding) using multiple, generally upright beams whose opposite ends are coupled to the upper and lower surfaces at or near each corner of the upper and lower surfaces. In one embodiment, four upright beams are generally perpendicular to the upper and lower surfaces and are coupled (e.g., by welding) to the upper and lower surfaces. In a further embodiment, there may be additional, generally upright beams coupled to the first and/or second beams of the upper and lower frame, placed at any suitable interval along the frame(s).

As further shown in FIG. 1, support frame 150 comprises a tongue, or other suitable connection means, to provide for mechanical harvester 100 to be detachably connected to a vehicle, such as a tractor. As further shown in FIG. 1, the support frame further comprises a front and/or rear axle with at least two wheels. In one embodiment, the two wheels may be pneumatic tires.

In another embodiment, the beams forming support frame 150 are 6 inch (15 cm) I-beams. However, it will be readily apparent to one skilled in the art that the present invention is not limited to a specific type or size of beam. For instance, the beams may comprise solid, cylindrical and/or tubular beams. Further, the beams may be of any suitable dimensions for providing support for collector 110.

In a further embodiment, the upper surface is longer than the lower surface of support frame 150. In this embodiment, two of the upright beams are coupled at or near the two front corners of the upper and lower surfaces and the other two vertical beams are coupled at or near the corners of the lower beam and at any suitable location on the first and second beams of the upper surface. A shaft 140 supporting a rear axle with two wheels is coupled to the upper surface (and optionally at a central location along the lower surface) of the support frame. The axle is rotatable around the shaft 140 allowing for the rear axle to pivot. In another embodiment, the width between the wheels on the front axle and the width between the wheels on the back axle are spaced about the same distance. In another embodiment, the width is about the same as the width of the wheels of a tractor and/or vineyard wagon. In a further embodiment, the width between the wheels on the front axle and the wheels on the back axle are about the same width as the distance between the grapevine rows.

Figure 4:
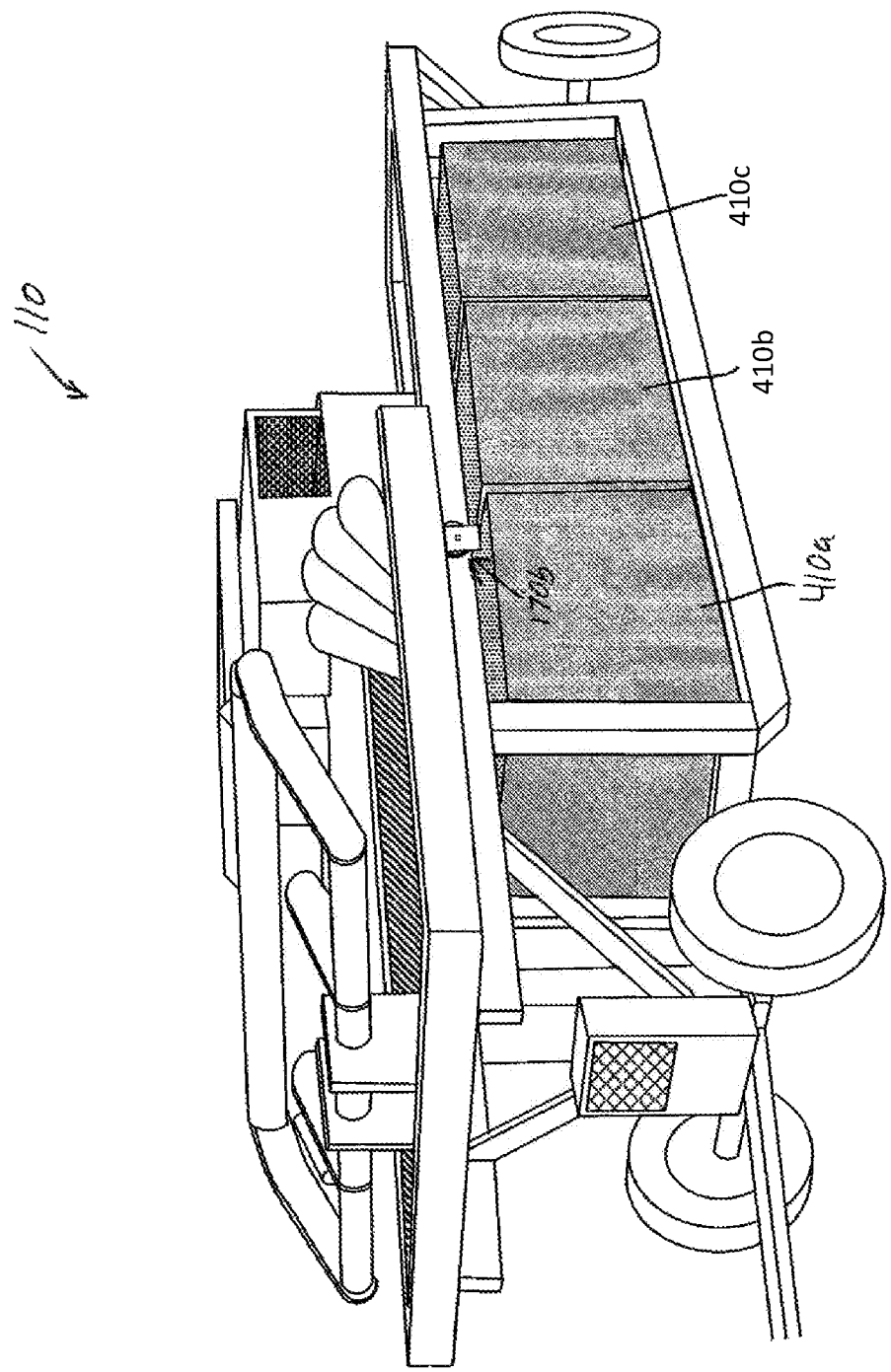
FIG. 4 is a perspective view of the mechanical harvester according to one embodiment.

Harvested grapes and/or raisins are often placed in bins. These bins are generally uniform in shape and may have dimensions of about 4 feet by 4 feet by 27 inches (1.2 m×1.2 m×68 cm). The distance between the upper and lower surfaces of the support frame can be any suitable distance enabling placement of one or more bins between the upper and lower surfaces. Further, the length of the support frame can be any length suitable for holding one or more bins. In a further embodiment, the lower surface may have one or more beams connected to the first and second beams capable of supporting one or more bins. FIG. 4 illustrates exemplary collector 110 in one embodiment where the support frame is capable of holding three bins (e.g., 410a-c) adjacent to one another.

Figure 2:
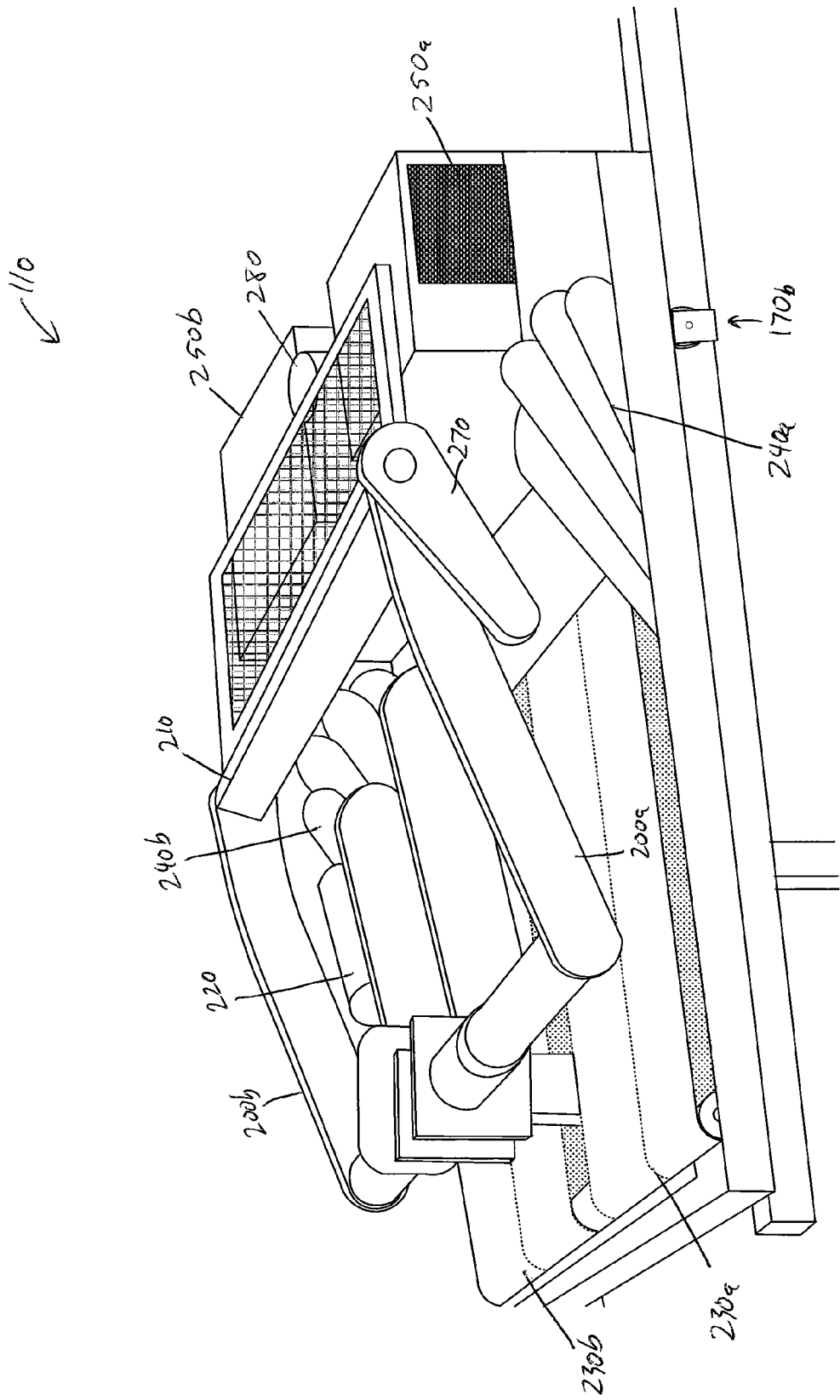
FIG. 2 is a perspective view of a collector of the mechanical harvester according to the embodiment of FIG. 1.
Figure 3:
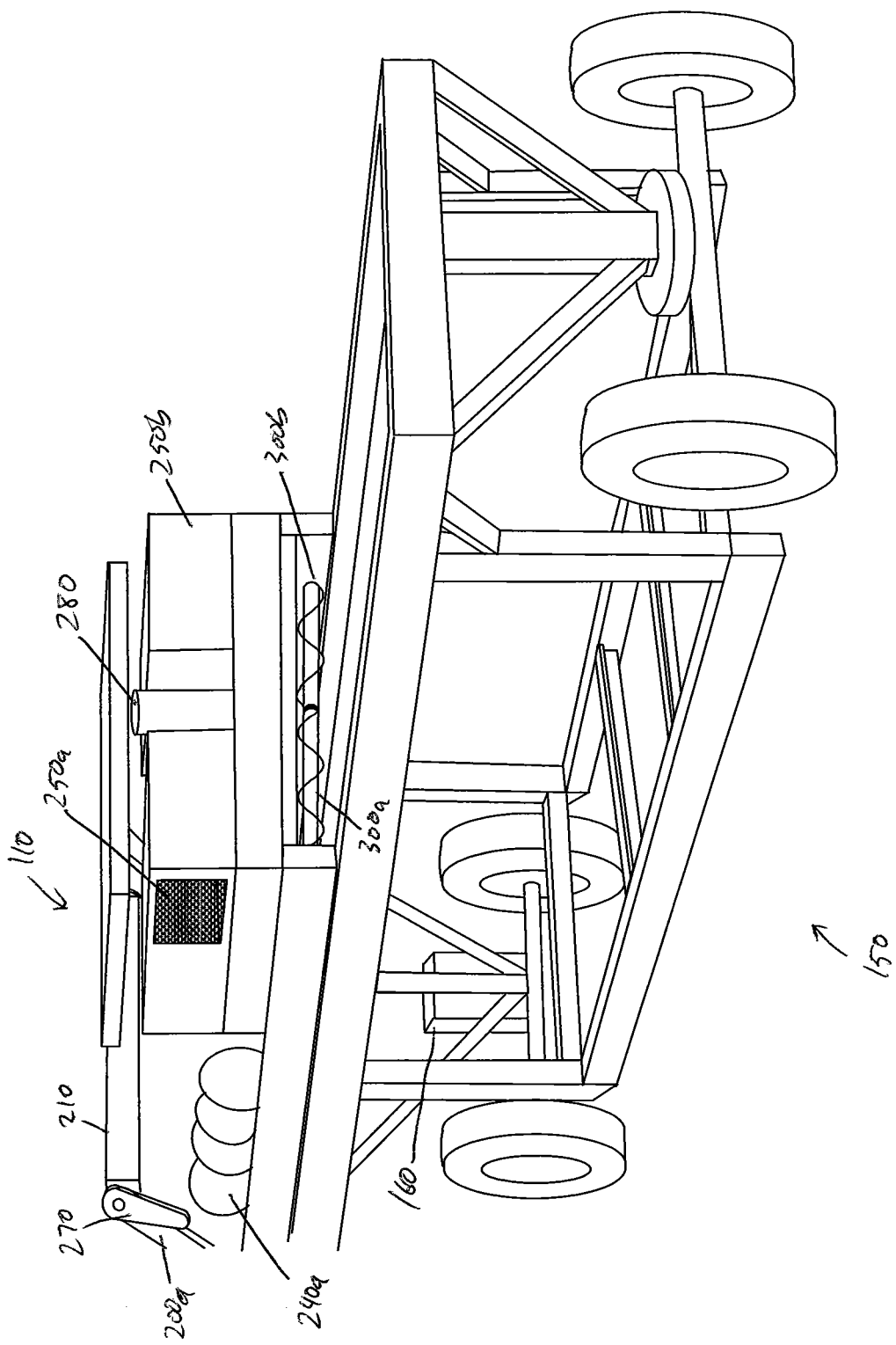
FIG. 3 is a rear view of the mechanical harvester according to the embodiment of FIG. 1.

FIG. 2 illustrates exemplary collector 110 for mechanical harvester 100 in accordance with embodiments of the present invention. Collector 110 may comprise two arms 200a and 200b, hydraulic system 220, one or more blowers (e.g., 250a and 250b), one or more conveyor belts (e.g., 230a and 230b), a beater 210, one or more series of fins (e.g., 240a and 240b), and one or more augers (as shown in FIG. 3 as 300a and 300b). Collector 110 may comprise two arms 200a and 200b supporting beater 210. The arms are connected to hydraulics 220 that provide for the raising and lowering of the two arms 200a and 200b and further provide for the rotation of beater 210 about a central axis. While the figures do not illustrate the hydraulic hoses connecting the hydraulic system 220 to the various components of mechanical harvester 100 and/or a tractor, it will be readily apparent to one skilled in the art that the hydraulic hoses can be of any number or location suitable for providing hydraulic power to components of mechanical harvester 100. Hydraulic system 220 may further be connected to optional radiator 160, hydraulics 280, and drive 270 that rotates beater 210. In one embodiment, hydraulics 220 of collector 110 is connectable to the hydraulic system of a vehicle, such as a tractor. In one embodiment, beater 210 comprises a square mechanical roller. However, it should be readily understood that beater 210 can be any suitable shape (e.g., cross-sectional shape) that provides for dislodging fruit and plant matter (e.g., circular, hexagonal, rectangular, square or rectangular with one or more rounded edges, etc.) from a dried grape vine or other form of plant, and can even include conventional vibrating (plastic) tubes or teeth.

Collector 110 further comprises one or more conveyor belts (e.g., 230a and 230b). Conveyor belts (e.g., 230a and 230b) can be any suitable configuration or type, such as a moving table, belt, etc. Conveyor belt(s) 230a and 230b transfer the fruit and plant matter dislodged by beater 210 to one or more blowers (e.g., 250a and 250b). Alternatively, the conveyor belts 230a and 230b may be replaced by moving beds of similar size, configuration and/or functionality.

One or more series of fins (e.g., 240a and 240b) extend along one or more sides of collector 110. In one embodiment, individual fins in the series of fins (e.g., 240a and 240b) slightly overlap one another. In a further embodiment, the series of fins (e.g., 240a and 240b) extend along the outermost edge of collector 110 and can be any length. In one embodiment the series of fins (e.g., 240a and 240b) about the same length as conveyor belt(s) (e.g., 230a and 230b).

The blower(s) (e.g., 250a and 250b) are configured or arranged to separate plant matter (e.g., leaves, cane, twigs, etc.) from the fruit. In some embodiments, blower(s) (e.g., 250a and 250b) are motorized fans which force air over and/or through the fruit and plant matter to separate some, most or all of the plant matter from the fruit. Collector 110 further comprises one or more augers (e.g., 300a and 300b in FIG. 3) that transfer the fruit and plant matter from the conveyor belt(s) (e.g., 230a and/or 230b) and deposit it into one or more bins held by support frame 150. Collector 110 may further comprise one or more motors to operate the conveyor(s), auger(s), and/or blower(s).

In various embodiments, collector 110 is moveably connected to support frame 150. In various embodiments, two or more rollers (e.g., 170a and 170b) are connected to the side of collector 110 and are movable along channels in the outer surface of support frame 150. In some embodiments, the rollers are located at or near the back of the collector (e.g., when more of the weight of the collector 110 is near the back), and the rollers 170a and 170b may be heavy-duty rollers. For example, when the frame 150 comprises 6" I-beams, the rollers 170a and 170b may be 5½ inches (14 cm) wide. In a further embodiment, the collector 110 may include additional rollers at or near the front of the collector that move along of the upper surface of support frame 150. For example, each of the "front" rollers may comprise cold round metal rollers and may be connected to the collector 110 by a pillow block bearing at each end of the roller(s). In one embodiment, the pillow block bearings are 1 ½" pillow block bearings.

In a further embodiment, the support frame 150 comprises a mechanism for moving the collector 110 along the upper surface of support frame 150. In one embodiment, a chain and gear mechanism slides collector 110 along support frame 150. The mechanism may comprise, for example, two or more sprocket(s) mounted to support frame 150. A two-way bracket is connected (e.g., by welding) to collector 110. The chain connects the sprockets with the two-way bracket to provide for movement of collector 110 along support frame 150. In one embodiment, the mechanism for moving collector 110 further comprises a motor and/or hydraulics configured to move collector 150. In another embodiment, collector 110 can be manually moved along the upper surface of support frame 150. In a further embodiment, collector 110 is detachably connected to support frame 150.

The mechanical harvester 100 can be any width suitable for harvesting fruit. In further embodiments, mechanical harvester 100 may be any suitable width for travelling down grapevine rows, which are typically spaced eight, ten or twelve feet apart. In one embodiment, support frame 150 and collector 110 are the same width. In another embodiment, collector 110 can be a different width than support frame 150. For instance, the width of collector 110 may be greater than the width of support frame 150.

In one embodiment, mechanical harvester 100 is any height suitable for harvesting fruit grown on an overhead trellis system. Although it may be ideal for harvesting grapes or dried-on-the-vine raisins, the present harvester may be useful for harvesting other vine fruits (e.g., tomatoes or "dried-on-the-vine" sun-dried tomatoes; berries such as blackberries, raspberries, huckleberries, marionberries, etc., any of which may be dried on the vine; passion fruit; various squash; melons, etc.), vining vegetables (e.g., beans, cucumbers, etc.), or even tree-based fruits and nuts where the tree can be grown or trained on an overhead trellis (e.g., apples, peaches, almonds, pecans, macadamias, avocados, oranges, etc.). The wire grid of an overhead trellis system is, in one such system, generally about seven feet above the ground. In such an embodiment, mechanical harvester 100 has a height suitable for the beater 210 to dislodge the fruit and/or plant matter.

Exemplary Methods of Making a Mechanical Harvester

Other embodiments of the present invention relate to methods of making a mechanical harvester. An exemplary method of manufacturing a mechanical harvester (e.g., the mechanical harvester of FIG. 1) is described below.

A method of making a mechanical harvester generally comprises (i) forming a support frame, (ii) forming a collector, configured to be supported by the support frame, and (iii) movably attaching the collector to the support frame. In further embodiments, (i) forming the support frame comprises welding or coupling multiple beam members in an arrangement/pattern (e.g., one or more rectangular patterns) that forms the frame disclosed herein, (ii) forming the collector comprises attaching a beater to one or more arm members, attaching a hydraulic or mechanical lifter to the arm member(s) and/or the beater, attaching one or more conveyors to the collector, attaching one or more blowers to the frame at or near one end (e.g., the rear) of the collector, attaching one or more series of fins to the side(s) of the collector and/or frame, and/or attaching one or more augers to the one end (e.g., the rear) of the collector. The method of making may comprise mechanically coupling one or more belts, hydraulics and/or motors to the conveyor(s), blower(s) and/or auger(s) to facilitate or enable operation of the conveyor(s), blower(s), and/or auger(s) as described herein.

The method may also further comprise forming a mechanism for moving the collector along the support frame. In one embodiment, a chain and gear system may be attached to the support frame for moving the collector.

Exemplary Methods of Using a Mechanical Harvester

Other embodiments of the present invention relate to methods of using a mechanical harvester, generally including (i) attaching a mechanical harvester as described herein to a tractor or other suitable vehicle, (ii) driving the tractor and mechanical harvester down rows of fruit, and (iii) collecting the fruit with the mechanical harvester. In one embodiment, the mechanical harvester collects fruit from grapevines grown on an overhead trellis system. In another embodiment, the tractor is preferably a low-profile tractor. In another embodiment, when one bin is suitably filled with fruit, the method may further comprise moving the collector along the support frame of the mechanical harvester to a suitable location where the collector will deposit the harvested fruit into another bin held by the support frame.

In another embodiment, the method of using the mechanical harvester may provide for detaching the collector from the support frame. For example, detaching the collector may aid in the transport of the mechanical harvester to different fields, storage of the mechanical harvester, and/or repair/maintenance of the mechanical harvester. In addition, the collector can be detached or removed and transferred to another harvester frame (e.g., to facilitate separate fruit harvesting and bin collection operations, in which full bins stay on the frame and are transported to a bin collection location without the collector remaining on the frame).

In another aspect or embodiment, the method of harvesting fruit may comprise dislodging the fruit from one or more plants to which the fruit is attached with a beater; collecting the dislodged fruit on a collector; removing plant matter from the fruit; and collecting said fruit in one or more bins. Thus, dislodging the fruit may also dislodge plant matter from the one or more plants, in which case removing the plant matter from the fruit in the method may comprise blowing, moving or forcing air over the fruit and plant matter to separate some or all of the plant matter from the fruit. In one such embodiment, the collector comprises a conveyor (e.g., conveyor belt) or moving bed that moves the fruit and plant matter into the blown, moved or forced air.

CONCLUSION

Embodiments of the present invention can advantageously provide for a mechanical harvester that may be connected to a vehicle, such as a tractor, for efficient harvesting of fruit. In some embodiments, the mechanical harvester comprises a support frame and a collector. The collector may comprise may comprise two arms, hydraulics, one or more blowers, one or more conveyor belts, one or more beaters and/or picking heads, one or more fins, and one or more augers. In some embodiments, the collector may comprise two arms supporting one or more beaters and/or picking heads.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A non-self-propelled harvester adapted to harvest fruit from plants on an overhead trellis, comprising:
   a) a frame with one or more shafts at a central location along a lower surface of the frame;
   b) a front axle and a rear axle, each with at least two wheels thereon, wherein at least one of the front and rear axles are coupled to and rotatable around the one or more shafts, allowing the coupled and rotatable axle(s) to pivot; and
   c) a collector connected to the frame, comprising:
      i) a beater configured to dislodge fruit and plant matter from the plants on the overhead trellis;
      ii) one or more arms attached directly or indirectly to the frame, supporting the beater;
      iii) a hydraulic or mechanical lifter connected to at least one of the one or more arms;
      iv) one or more conveyors configured to collect the fruit dislodged from the plants by the beater;
      v) one or more bins held by the flame; and
      vi) one or more augers configured to deposit the fruit into the one or more bins.

2. The harvester of claim 1, further comprising one or more blowers secured to at least one of the frame and the collector, configured to blow, move or force air over the fruit and plant matter and separate some or all of the plant matter from the fruit, wherein the one or more conveyors are configured to move the fruit and plant matter into the air blown, moved or forced by the one or more blowers.

3. The harvester of claim 2, further comprising one or more motors to operate the conveyor(s), the auger(s), the blower(s), or a combination thereof.

4. The harvester of claim 1, having a height suitable for the beater to dislodge said fruit plant matter from the one or more plants on said overhead trellis and a width suitable to travel in a space between adjacent rows of the one or more plants, wherein the frame has an upper surface and a lower surface parallel or substantially parallel thereto, coupled together by multiple upright beams.

5. The harvester of claim 4, wherein each of the upper surface and the lower surface are substantially rectangular, and each of the upper surface and the lower surface comprise first and second beams coupled to each other by a third beam at or near one end of the first and second beams, and the lower surface further comprises a fourth beam at an opposite end of the first and second beams.

6. The harvester of claim 5, wherein the one or more bins comprises a plurality of bins, the lower surface of the frame further comprises at least one fifth beam fixed perpendicularly to the first and second beams of the lower surface of the frame, the lower surface of the frame being configured to hold the plurality of bins, a distance between the upper and lower surfaces of the frame enables placement of the one or more bins between the upper and lower surfaces, the collector is movably connected to the upper surface of the frame, and the harvester further comprises a mechanism for moving the collector along the upper surface of the frame.

7. The harvester of claim 1, wherein the one or more plants comprise a plurality of plants arranged in rows, and a width between the wheels on each of the front axle and the rear axle is suitable to travel in a space between adjacent rows of the plants.

8. The harvester of claim 7, having a height suitable for harvesting and/or removing said fruit from said overhead trellis, wherein the one or more arms comprises two arms, the hydraulic or mechanical lifter is the hydraulic lifter, the collector further comprises a central axis or rod between the two arms that provides for rotational movement of the beater, the frame has an upper surface at a height below the overhead trellis to allow the hydraulic lifter to raise and lower the two arms, and said overhead trellis is about seven feet above the ground.

9. The harvester of claim 8, wherein the beater has a cross-sectional shape selected from square, rectangular, circular, hexagonal, oval, and square or rectangular with one or more rounded edges.

10. A harvesting tractor, comprising:
   a) harvester of claim 1; and
   b) a tractor, comprising
      i) an engine,
      ii) a plurality of wheels; and
      iii) a steering mechanism.

11. The harvesting tractor of claim 10, wherein the rear axle is coupled to the shaft and is rotatable around the shaft, allowing the rear axle to pivot.

12. A method of harvesting fruit, comprising:
   a) attaching the harvester of claim 1 to a tractor or other vehicle,
   b) driving the tractor and the harvester down rows of fruit, and
   c) collecting the fruit with the harvester.

13. A method of harvesting fruit, comprising:
   a) using the harvester of claim 1, dislodging said fruit from one or more plants to which the fruit is attached with the beater;
   b) collecting said dislodged fruit on the collector;
   c) removing plant matter from the fruit; and
   d) collecting said fruit in the one or more bins.

14. The method of claim 13, wherein dislodging said fruit also dislodges plant matter from the one or more plants.

15. The method of claim 14, wherein removing the plant matter from the fruit comprises blowing, moving or forcing air over the fruit and plant matter to separate some or all of the plant matter from the fruit.

16. The method of claim 15, wherein the one or more conveyors move the fruit and plant matter into the blown, moved or forced air.

* * * * *